United States Patent
Burgman et al.

(10) Patent No.: US 8,628,449 B1
(45) Date of Patent: Jan. 14, 2014

(54) LOW MASS PLANETARY CARRIER AND CLUTCH HOUSING

(71) Applicant: GM Global Technology Operations LLC, Detroit, MI (US)

(72) Inventors: Boris Burgman, Oak Park, MI (US); David M. Zini, Novi, MI (US); Derrick R. Black, Waterford, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 13/743,994

(22) Filed: Jan. 17, 2013

(51) Int. Cl.
*F16H 57/08* (2006.01)

(52) U.S. Cl.
USPC ............. 475/348; 475/331; 74/640; 74/606 R

(58) Field of Classification Search
USPC .......................... 475/331, 348; 74/640, 606 R
See application file for complete search history.

(56) References Cited

U.S. PATENT DOCUMENTS

| 4,280,376 | A * | 7/1981 | Rosen | 475/342 |
| 2003/0100399 | A1* | 5/2003 | Hayabuchi et al. | 475/331 |
| 2006/0183592 | A1* | 8/2006 | Kingston | 475/331 |
| 2009/0105033 | A1* | 4/2009 | Woo | 475/331 |
| 2012/0129642 | A1* | 5/2012 | Palfai et al. | 475/149 |

* cited by examiner

*Primary Examiner* — Justin Holmes

(57) ABSTRACT

A low mass, two piece planetary gear carrier having an integrated clutch housing comprises a first carrier flange and clutch housing and a second carrier flange which are secured together by a plurality of threaded fasteners extending through hollow dowels. A plurality of planet gears receive needle bearing assemblies which are, in turn, supported on pins or stub shafts. The stub shafts are retained in the carrier by transverse retaining pins received in the second carrier flange and extending into the shafts. Unitized washers are disposed between both faces of the planet gears and the flanges. The method of assembly is also a feature of the present invention.

17 Claims, 2 Drawing Sheets

LOW MASS PLANETARY CARRIER AND CLUTCH HOUSING

FIELD

The present disclosure relates to planetary gear assemblies for use in automatic motor vehicle transmissions and more particularly to a low mass, two piece planetary gear carrier having an integrated clutch housing.

BACKGROUND

The statements in this section merely provide background information related to the present disclosure and may or may not constitute prior art.

Planetary gear assemblies used in automatic motor vehicle transmissions are subject to numerous fabrication, assembly and operational constraints. Because it is the largest and heaviest member of the planetary gear assembly and because it receives and supports the planet gears, this is particularly true of the planet gear carrier.

Because of it size, it is always desirable to minimize its weight and thus to reduce its inertia as an energy saving consideration. Such weight reductions are, of course, limited to reductions which do not compromise the strength and durability of the carrier. Because the planet gears reside within the carrier, consideration must be given to how these gears as well as shafts, bearings and washers will not only be accommodated but also installed within the carrier. Finally, there is the issue of lubrication: consideration must be given to ensuring proper lubrication flow to the shafts and planet gears by incorporating appropriate fluid passageways. Such passageways must be capable of providing lubricating fluid not only when the carrier is rotating but also when it is stationary and the planet gears are rotating.

SUMMARY

The present invention provides a low mass two piece planetary gear carrier having an integrated clutch housing. The planetary gear carrier comprises a first carrier flange and clutch housing and a second carrier flange which are bolted together by a plurality of threaded fasteners extending through hollow dowels. A plurality of planet gears receive needle bearing assemblies which are, in turn, supported on pins or stub shafts. The stub shafts are retained in the gear carrier by transverse retaining pins received in the second carrier flange and extending into the shafts. Unitized washers are disposed between both faces of the planet gears and the flanges. The method of assembly is also a feature of the present invention.

Thus it is an aspect of the present invention to provide a low mass planetary gear assembly.

It is a further aspect of the present invention to provide a low mass, two piece planetary gear assembly.

It is a still further aspect of the present invention to provide a low mass planetary gear carrier.

It is a still further aspect of the present invention to provide a low mass, two piece planetary gear carrier.

It is a still further aspect of the present invention to provide a low mass planetary gear carrier having an integrated clutch housing.

It is a still further aspect of the present invention to provide a low mass, two piece planetary gear carrier having an integrated clutch housing.

It is a still further aspect of the present invention to provide a low mass planetary gear carrier having a first carrier flange and clutch housing and a second carrier flange which are secured together.

It is a still further aspect of the present invention to provide a low mass planetary gear carrier a first carrier flange and clutch housing and a second carrier flange which are secured together by a plurality of threaded fasteners.

It is a still further aspect of the present invention to provide a low mass planetary gear carrier a first carrier flange and clutch housing and a second carrier flange which are secured together by a plurality of threaded fasteners extending through hollow dowels.

Further aspects, advantages and areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
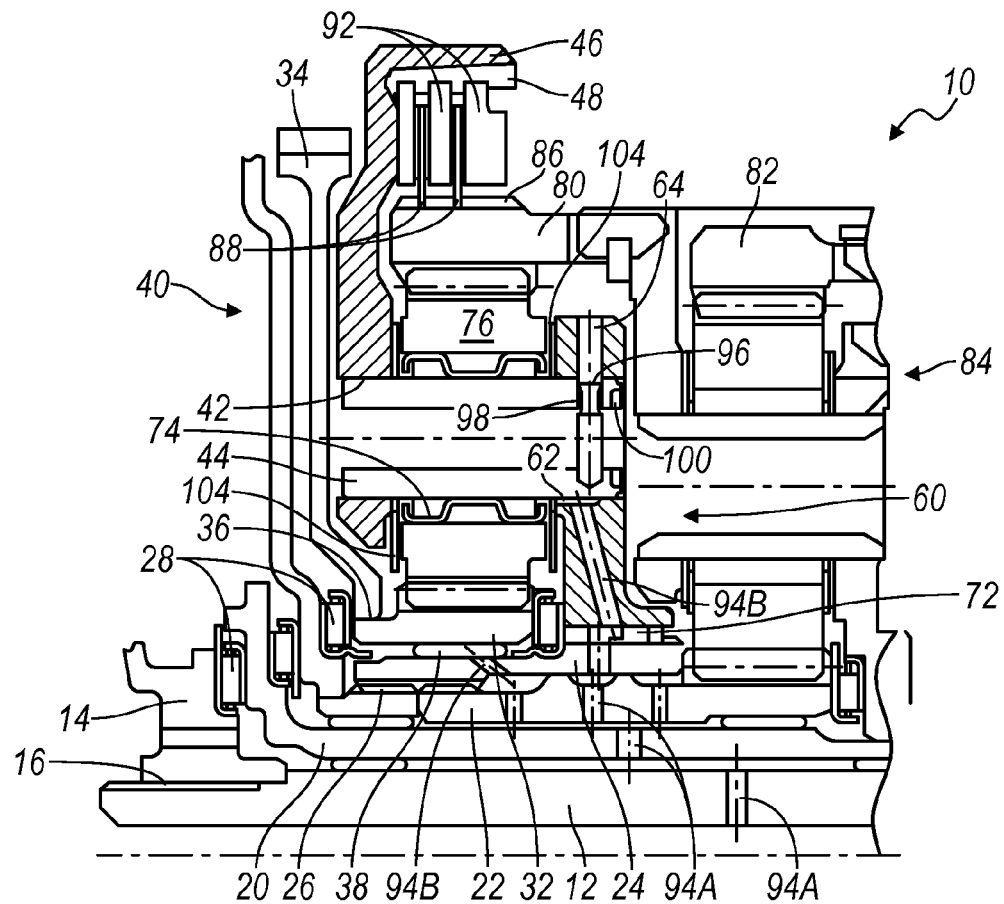
FIG. 1 is a fragmentary, sectional view of a portion of a transmission incorporating the present invention taken through a pinion gear, bearing and stub shaft.

With reference to FIG. 1, a portion of an automatic motor vehicle transmission incorporating the present invention is illustrated and generally designated by the reference number 10. The automatic transmission 10 includes a first or main, center axis shaft or quill 12 about which many components of the transmission 10 are co-axially or concentrically arrayed. For example, a second co-axial drive member 14 is coupled by interengaging spines 16 to the first or main shaft or quill 12, a third quill or tubular drive member 20 is co-axially disposed about the first or main shaft or quill 12, a fourth co-axial multiple component quill or tubular drive member 22 is disposed about the third quill or tubular drive member 20 and the first or main shaft for quill 12 and a fifth co-axial quill or drive member 24 is coupled to the components of the fourth quill or tubular drive member 22 by interengaging splines 26. The transmission 10 also include a plurality of thrust bearings 28 that axially position and rotationally isolate the just recited components and radially extending members coupled thereto according to conventional practice.

A planetary gear assembly 30 having an integrated clutch housing according to the present invention resides in the automatic transmission 10. The planetary gear assembly 30 includes a sun gear 32 which is coupled to a radially extending drive disc or plate 34 by an interengaging spline set 36.

The sun gear 32 is freely rotatably supported on a needle bearing assembly 38 on the fifth quill or drive member 24. The planetary gear assembly 30 includes a first carrier flange and clutch housing 40 and a second carrier flange 60. The first carrier flange and clutch housing 40 includes a plurality of apertures or openings 42 (one of which is illustrated in FIG. 1) for receiving a like plurality of pins or stub shafts 44 (one of which is illustrated in FIG. 1) and an axially extending outer flange 46 carrying or defining a plurality of female splines 48.

Figure 2:
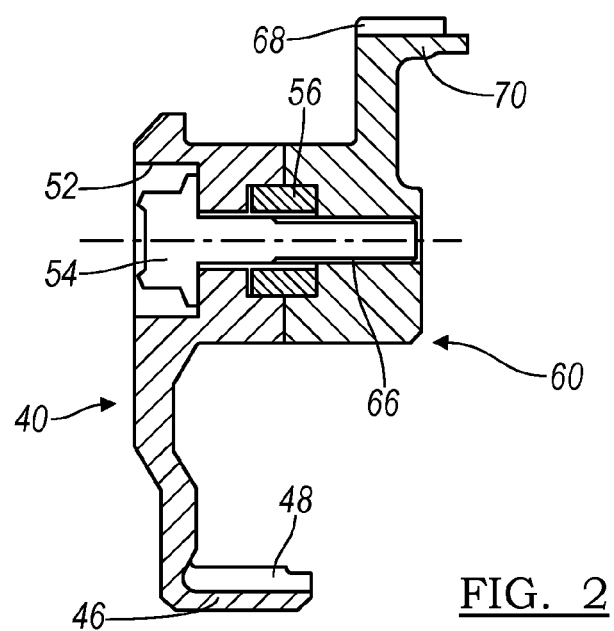
FIG. 2 is a half sectional view of a planetary gear carrier having an integrated clutch housing according to the present invention taken through a threaded fastener and hollow dowel.

Referring now to FIGS. 1 and 2, the first carrier flange and clutch housing 40 also includes a plurality of double counterbored openings 52 which receive a like plurality of threaded fasteners 54 and a portion of each of a pair of hollow dowels 56. The second carrier flange 60 likewise includes a plurality of apertures or openings 62 which are sized and arranged as the apertures or openings 42 in the first carrier flange and clutch housing 40 and receive the pins or stub shafts 44. The second carrier flange 60 also includes a plurality of radial apertures 64 which intersect each of the apertures or openings 62. The second carrier flange 60 further includes a plurality of counterbored and threaded openings 66 which receive a portion of the hollow dowels 56 and the threaded fasteners 54. The second carrier flange 60 also includes a plurality of female splines 68 disposed about a center or inner flange 70. The female splines 68 engage male splines 72 on the fifth quill or drive member 24.

Referring again to FIG. 1, disposed on each of the pins or stub shafts 44 is a needle bearing assembly 74 (one of which is illustrated in FIG. 1) which freely rotatably supports a respective planet gear 76 (one of which is illustrated in FIG. 1). Each of the planet gears 76 is in constant mesh with the sun gear 32 and a ring gear 80. The ring gear 80 may be supported by and coupled to, for example, other components such as a ring gear 82 of an adjacent planetary gear assembly 84 and may include male splines 86 which engage a first plurality of friction plates or discs 88 of a friction clutch assembly 90. The friction clutch assembly 90 also includes a second plurality of friction plates or discs 92 interleaved with the first plurality of friction plates or discs 88 which engages the female splines 48 on the first carrier flange and clutch housing 40.

The planetary gear assembly 30 according to the present invention also includes features and aspects which ensure good and sufficient lubrication under all operating conditions. As illustrated in FIG. 1, the first or main shaft or quill 12 is preferably hollow and is pressurized with hydraulic (transmission) fluid from a pump (not illustrated). Radial passageways 94A in the various shafts or quills 12, 14, 20 and 22 and oblique passageways 94B in the quill 24 and the second carrier flange 60 provide lubricating fluid directly to the sun gear 32 and to each of the pins or stub shafts 44 supporting the needle bearing assemblies 74 and the planet gears 76.

Figure 3:
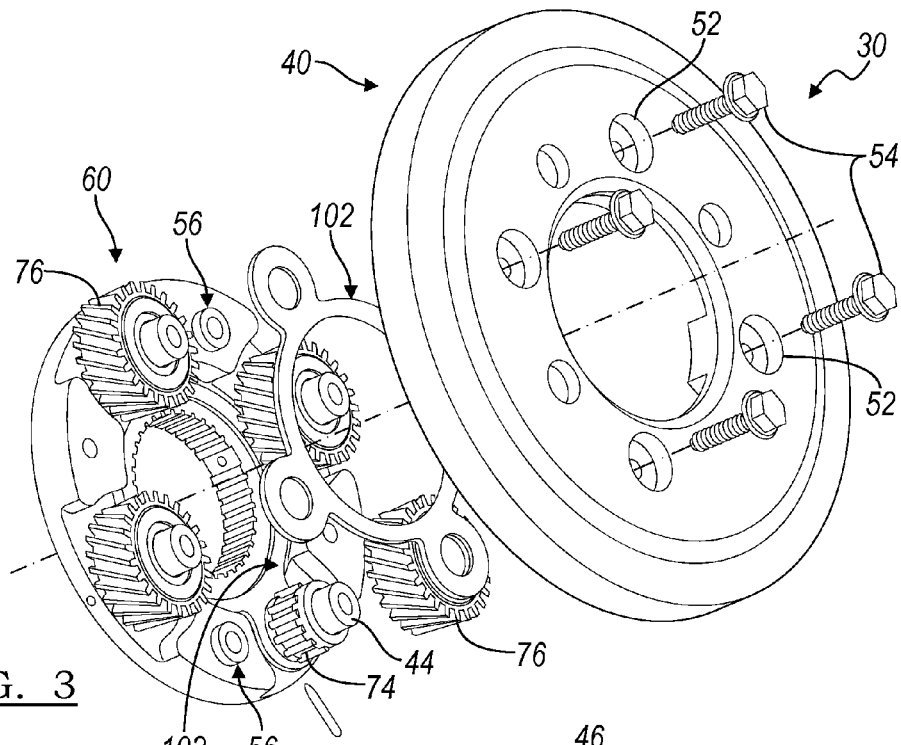
FIG. 3 is an exploded view of a planetary gear carrier having an integrated clutch housing according to the present invention from a first perspective.
Figure 4:
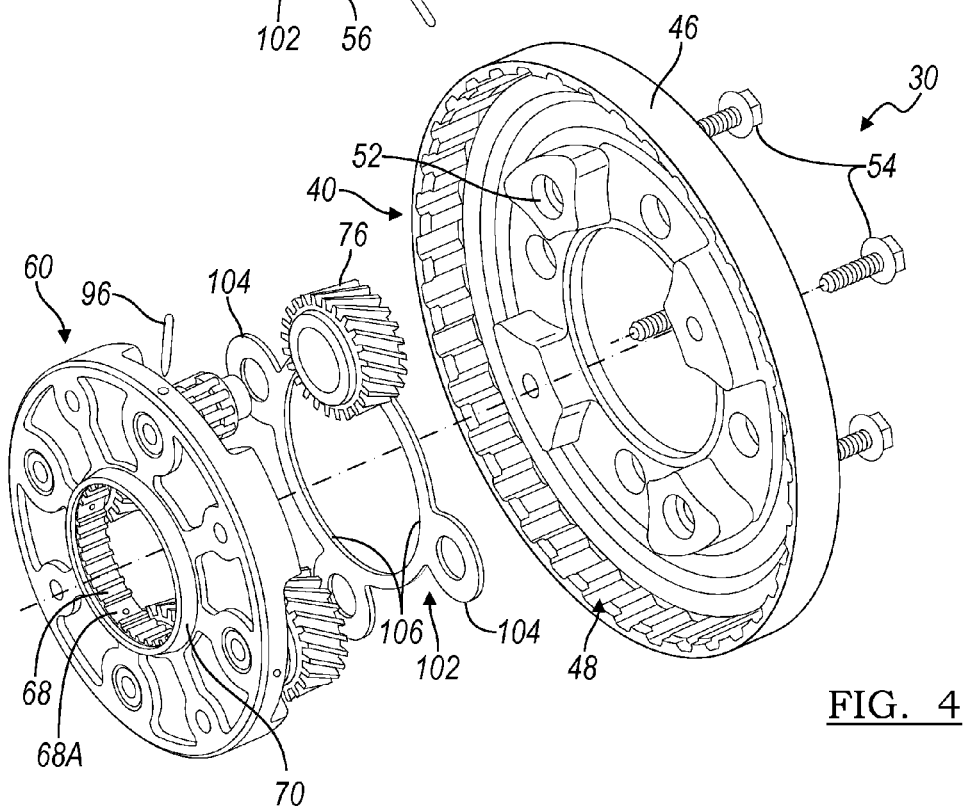
FIG. 4 is an exploded view of a planetary gear carrier having an integrated clutch housing according to the present invention from a second perspective.

In order to ensure transfer of the lubricating fluid from the fifth quill or drive member 24 to the center or inner flange 70 of the second carrier flange 60 (and on to the planet gears 76) and particularly across the male splines 72 and the female splines 68, at least one female spline 68 in the region 68A of the lubricating passages 94B is omitted, as illustrated in FIGS. 3 and 4, and the region is filled in with a wide, solid male spline 72 complementary to the region 68A such that there is a small clearance between the outside diameters of the splines 68 and 72. This major diameter fit of the splines 68 and 72 provides sufficient sealing to properly direct the lubricating fluid across the splines 68 and 72, even when the first and second carrier flanges 40 and 60 are stationary.

Referring now to FIGS. 1, 3 and 4, additional components of the planetary gear assembly 30 according to the present invention and the steps involved in its assembly will now be set forth. After fabrication of the first carrier flange and clutch housing 40 and the second carrier flange 60 which are preferably die cast from aluminum to reduce mass and inertia whereby the female splines 48 are net formed, the hollow dowels 56 are pressed into the counterbored and threaded openings 66. Next, the pins or stub shafts 44 are installed in the apertures or openings 62 of the second carrier flange 60 and a retaining pin 96 is installed in each of the radial apertures 64 and through a complementary aperture 98 in each of the pins or stub shafts 44. To retain the retaining pins 96 in the stub shafts 44 and thereby retain the stub shafts 44 in the second carrier flange 60, the ends of the stub shafts 44 proximate the retaining pins 96 are upset or swaged as indicated by the reference number 100.

Next, unitized washers 102, that is, washer assemblies that include two or four washers 104 coupled or connected by bands or strips of material 106 from which the washers 104 are fabricated which thereby simultaneously locate and install all of the washers 104 in one operation are first placed on the second carrier flange over the pins or stub shafts 44. Then, the needle bearing assemblies 74, the planet gears 76 and another unitized washer 102 are installed. Next, the first carrier flange and clutch housing 40 is engaged with the stub shafts 44 and the hollow dowels 56. The hollow dowels 56 are a tight clearance fit within the counterbored openings 52 and 66 and thus ensure accurate alignment and registration between the first carrier flange and clutch housing 40 and the second carrier flange 60 as they are assembled. Last of all, the threaded fasteners 54 are installed in the counterbored openings 52 and tightened down.

The description of the invention is merely exemplary in nature and variations that do not depart from the gist of the invention are intended to be within the scope of the invention. Such variations are not to be regarded as a departure from the spirit and scope of the invention.

What is claimed is:

1. A planetary gear carrier and clutch housing comprising, in combination,
    a first planet carrier and clutch housing having a first plurality of openings for receiving stub shafts and a second plurality of counterbored openings for receiving hollow dowels,
    a second planet carrier having a first plurality of openings for receiving stub shafts aligned with said first plurality of openings in said first planet carrier and clutch housing and a second plurality of counterbored openings aligned with said second plurality of counterbored openings in said first planet carrier and clutch housing,
    a plurality of stub shafts extending between said first pluralities of openings, said stub shafts supporting a needle bearing assembly and a planet gear,
    a hollow dowel disposed in each of a pair of said second pluralities of counterbored openings and threaded fasteners extending through said hollow dowels and between said first planet carrier and clutch housing and said second planet carrier,
    a sun gear engaging each of said planet gears, and
    a ring gear engaging each of said planet gears.

2. The planetary gear carrier and clutch housing of claim 1 further including retaining pins extending through said second planet carrier and into each of said stub shafts.

3. The planetary gear carrier and clutch housing of claim 1 further including a unitized washer disposed between each side of said planet gears and said first and second carriers.

4. The planetary gear carrier and clutch housing of claim 1 wherein said second planet carrier includes an opening having female splines and lubrication passageways extending from said splined opening into said first plurality of openings and further including a drive member having male splines engaging said female splines of said second planet carrier and wherein a region without a female spline resides proximate said lubrication passageways and a solid region complementary to said region without a female spline resides on said drive member.

5. The planetary gear carrier and clutch housing of claim 1 further including through axial passageways in said stub shafts.

6. The planetary gear carrier and clutch housing of claim 1 wherein said first planet carrier and clutch housing includes an outer flange having female splines, said ring gear includes male splines and further including first and second pluralities of friction clutch plates coupled to a respective one of said female splines and said male splines.

7. The planetary gear carrier and clutch housing of claim 1 wherein said sun gear is coupled to a tubular drive member.

8. A planetary gear carrier and clutch housing comprising, in combination,
   a first planet carrier and clutch housing having a first plurality of openings for receiving stub shafts, a second plurality of counterbored openings for receiving hollow dowels and an outer flange having female splines,
   a second planet carrier having a first plurality of openings for receiving stub shafts aligned with said first plurality of openings in said first planet carrier and clutch housing and a second plurality of counterbored openings aligned with said second plurality of counterbored openings in said first planet carrier and clutch housing,
   a plurality of stub shafts extending between said first pluralities of openings, said stub shafts supporting a needle bearing assembly and a planet gear,
   a hollow dowel disposed in a pair of said second plurality of counterbored openings and threaded fasteners extending through said hollow dowels and between said first planet carrier and clutch housing and said second planet carrier,
   a sun gear engaging each of said planet gears,
   a ring gear engaging each of said planet gears and defining a plurality of male splines, and
   a friction clutch pack having a first plurality of clutch discs engaged by said female splines and a second plurality of clutch discs interleaved with said first plurality of clutch discs and engaged by said male splines.

9. The planetary gear carrier and clutch housing of claim 8 further including retaining pins extending through said second planet carrier and into each of said stub shafts.

10. The planetary gear carrier and clutch housing of claim 9 wherein said retaining pins are retained in said stub shafts by swaging.

11. The planetary gear carrier and clutch housing of claim 8 further including a unitized washer disposed between each side of said planet gears and said first and second carriers.

12. The planetary gear carrier and clutch housing of claim 8 wherein said second planet carrier includes an opening having female splines and lubrication passageways extending from said splined opening into said first plurality of openings and further including a drive member having male splines engaging said female splines of said second planet carrier and wherein a region without a female spline resides proximate said lubrication passageways and a solid region complementary to said region without a female spline resides on said drive member.

13. A planetary gear carrier and clutch housing comprising, in combination,
   a first planet carrier and clutch housing having a first plurality of openings for receiving stub shafts, a pair of counterbored openings for receiving hollow dowels and an outer flange,
   a second planet carrier having a first plurality of openings aligned with said first plurality of openings in said first planet carrier and clutch housing and a second plurality of counterbored openings aligned with said second plurality of counterbored openings in said first planet carrier and clutch housing,
   a plurality of stub shafts extending between said first pluralities of openings, said stub shafts supporting a needle bearing assembly and a planet gear,
   hollow dowels disposed in said second pluralities of counterbored openings and threaded fasteners extending through said hollow dowels and between said first planet carrier and clutch housing and said second planet carrier,
   a sun gear engaging each of said planet gears,
   a ring gear engaging each of said planet gears, and
   a friction clutch pack operably disposed between said ring gear and said outer flange.

14. The planetary gear carrier and clutch housing of claim 13 further including retaining pins extending through said second planet carrier and into each of said stub shafts.

15. The planetary gear carrier and clutch housing of claim 13 further including a unitized washer disposed between each side of said planet gears and said first and second carriers.

16. The planetary gear carrier and clutch housing of claim 13 wherein said second planet carrier includes an opening having female splines and lubrication passageways extending from said splined opening into said first plurality of openings and further including a drive member having male splines engaging said female splines of said second planet carrier and wherein a region without a female spline resides proximate said lubrication passageways and a solid region complementary to said region without a female spline resides on said drive member.

17. The planetary gear carrier and clutch housing of claim 13 wherein said outer flange includes female splines, said ring gear includes male splines and said friction clutch pack includes first and second interleaved pluralities of clutch plates coupled to a respective one of said female splines and said male splines.

* * * * *